(12) United States Patent
Streete et al.

(10) Patent No.: US 10,680,970 B1
(45) Date of Patent: Jun. 9, 2020

(54) STACK-BASED RESOURCE MANAGEMENT SYSTEM AND METHOD FOR A DISTRIBUTED COMPUTING ENVIRONMENT

(71) Applicant: VCE IP Holding Company LLC, Richardson, TX (US)

(72) Inventors: Jonathan Streete, San Jose, CA (US); Seamus Kerrigan, Ballincollig (IE)

(73) Assignee: EMC IP Holding Company LLC, Round Rock, TX (US)

( * ) Notice: Subject to any disclaimer, the term of this patent is extended or adjusted under 35 U.S.C. 154(b) by 289 days.

(21) Appl. No.: 15/499,179

(22) Filed: Apr. 27, 2017

(51) Int. Cl.
*H04L 12/911* (2013.01)
*H04L 29/08* (2006.01)

(52) U.S. Cl.
CPC .............. *H04L 47/78* (2013.01); *H04L 67/10* (2013.01)

(58) Field of Classification Search
CPC ................................ H04L 47/78; H04L 67/10
See application file for complete search history.

(56) References Cited

U.S. PATENT DOCUMENTS

| | | | | |
|---|---|---|---|---|
| 6,851,108 B1* | 2/2005 | Syme | ................... | G06F 9/44589 717/118 |
| 7,546,353 B2* | 6/2009 | Hesselink | ........... | H04L 63/0272 709/216 |
| 7,827,531 B2* | 11/2010 | Sen | ..................... | G06F 11/3688 717/124 |
| 9,471,370 B2* | 10/2016 | Marinelli, III | .......... | G06F 9/466 |
| 10,152,306 B2* | 12/2018 | Ryan | ......................... | G06F 8/10 |
| 2008/0168425 A1* | 7/2008 | Sen | ..................... | G06F 11/3688 717/124 |
| 2009/0070746 A1* | 3/2009 | Dhurjati | .............. | G06F 11/3676 717/128 |
| 2010/0186024 A1* | 7/2010 | Eker | ....................... | G06F 9/547 719/330 |
| 2013/0003735 A1* | 1/2013 | Chao | ........................ | H04L 45/66 370/392 |
| 2014/0115610 A1* | 4/2014 | Marinelli, III | .......... | G06F 9/547 719/330 |

FOREIGN PATENT DOCUMENTS

KR          2018058579 A   * 11/2016   .............. G06F 11/36

* cited by examiner

*Primary Examiner* — Uzma Alam
(74) *Attorney, Agent, or Firm* — Polsinelli PC

(57) ABSTRACT

A stack-based resource management system includes a computer-executed tool for managing the resources used to execute a distributed application. The tool uses a distributed computing environment protocol stack having multiple layers that each represents one or more resources used to execute a distributed application. The resources in each layer have one or more inter-layer dependencies to one or more resources of an adjacent layer. When the tool receives configuration instructions to configure one or more resources, it configures that resource, and identifies one or more inter-layer dependencies to resources in adjacent layers to configure those resources in the adjacent layers. The tool then sequentially traverse up and down the adjacent layers of the protocol stack to resolve any of the dependencies among the resources of each adjacent layer of the protocol stack.

18 Claims, 7 Drawing Sheets

STACK-BASED RESOURCE MANAGEMENT SYSTEM AND METHOD FOR A DISTRIBUTED COMPUTING ENVIRONMENT

TECHNICAL FIELD

Aspects of the present disclosure relate to computing devices and, in particular, to a stack-based resource management system and method for a distributed computing environment.

BACKGROUND

Distributed computing environments, such as cloud computing environments and/or virtualized computing environments, have been developed to provide services over a network, which may include the Internet, in a manner that does not necessarily require intimate knowledge of logistical concerns as to how the service is provided. That is, due to resources being remotely managed, often in a dedicated computing environment, users of the resources of cloud computing environments or virtualized computing environments may be alleviated from many logistical concerns, such as access to electrical power, failover events, reliability, availability, and the like. Additionally, resources provided by cloud computing environments may be relatively efficient due to their ability to share computing resources across multiple users (e.g., tenants), while delegating software development and maintenance costs to administrators of the cloud computing environment.

SUMMARY

According to one aspect of the present disclosure, a stack-based resource management system includes a computer-executed tool for managing the resources used to execute a distributed application. The tool uses a distributed computing environment protocol stack having multiple layers that each represents one or more resources used to execute a distributed application. The resources in each layer have one or more inter-layer dependencies to one or more resources of an adjacent layer. When the tool receives configuration instructions to configure one or more resources, it configures that resource, and identifies one or more inter-layer dependencies to resources in adjacent layers to configure those resources in the adjacent layers. The tool then sequentially traverse up and down the adjacent layers of the protocol stack to resolve any of the dependencies among the resources of each adjacent layer of the protocol stack.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1A:
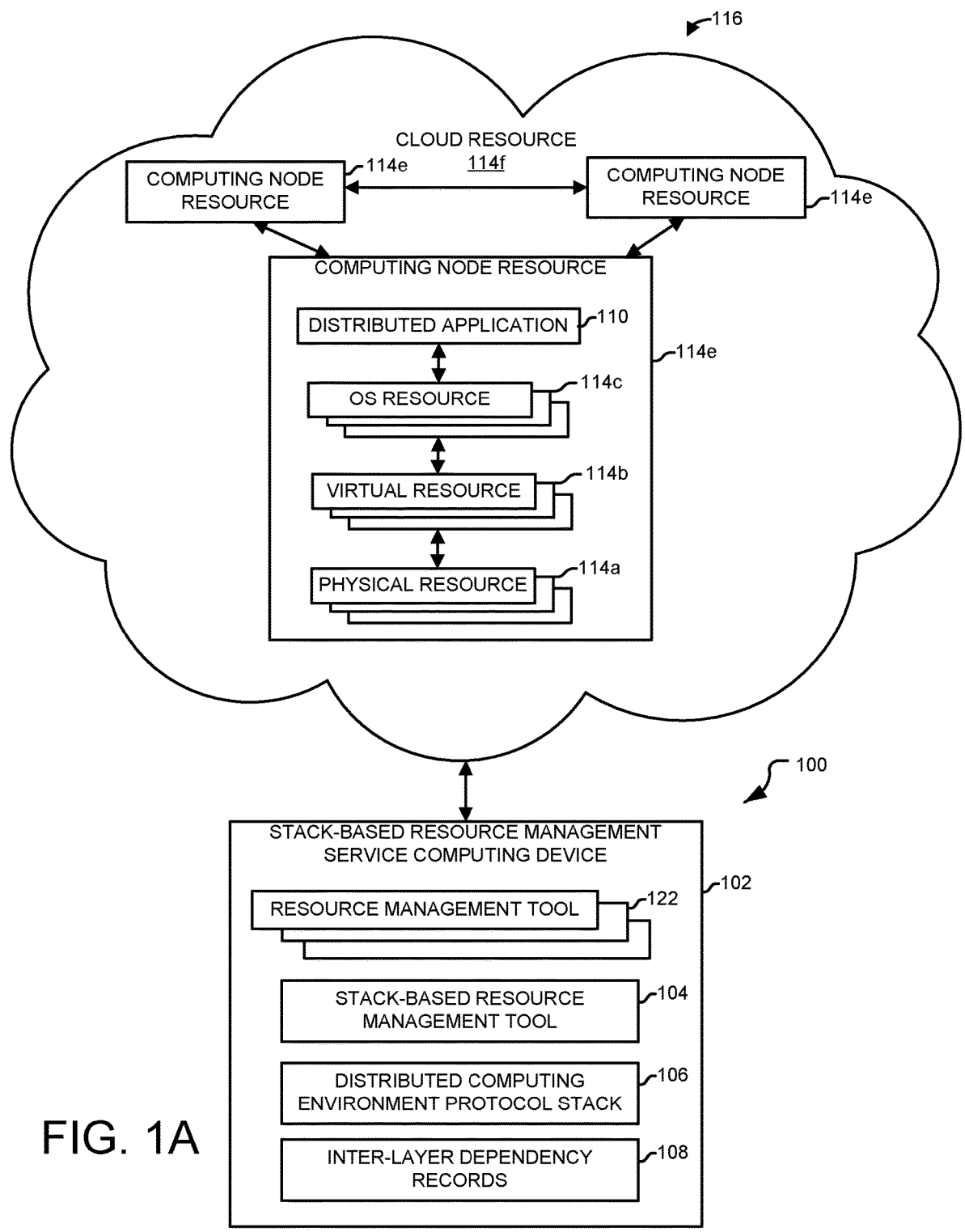
FIGS. 1A and 1B illustrate an example stack-based resource management system according to the teachings of the present disclosure.

Embodiments of the present disclosure provide a system for managing the resources used to execute a distributed application in a distributed computing environment, such as a cloud computing environment, in which the resources may be dispersed over multiple computing node resources, and/or a virtualized computing environment in which the resources may include virtualized components distributed over multiple physical devices. In particular, the system manages the resources by organizing the resources according to a protocol stack having multiple layers in which the resources in one layer may have dependencies to the resources in its adjacent layers. Thus, when configuration changes are made to resources in a particular layer, the system identifies any dependencies that may exist to the resources of an adjacent layer above and below that layer so that those resources may also be configured to resolve any dependencies that may exist up and down the protocol stack.

Cloud computing provides certain advantages over traditional computing approaches for several reasons. For one reason, users may be alleviated from various burdensome tasks typically associated with the management of physical computing resources, such as periodic software and/or hardware upgrades, bug fixes to software code or the hardware resources used to execute the software, access to reliable electrical power sources, and the like. Additionally, cloud computing provides an extensible system that can readily grow and/or shrink according to ongoing needs of the distributed applications executed on the cloud computing environment.

Computing clouds may include public clouds or private clouds. Private clouds generally refer to computing clouds that are essentially administered by the same entity that uses the computing cloud. Public clouds, on the other hand, generally refer to computing clouds administered by an entity that sells or leases its resources to users commonly referred to as tenants. Examples of such computing clouds include an Amazon Web Service™ (AWS), an Amazon Elastic Compute Cloud (EC2™), Amazon Elastic Block Store (EBS™), and Google Cloud™.

Public cloud computing environments often provide virtual resources on a lease-by-lease basis. That is, users (e.g., tenants) may be allocated resources based upon usage (e.g., data throughput, amount of memory used, etc.) and/or upon periodic service charges (e.g., monthly subscription fees). Also, certain cloud computing environments may provide certain features that other cloud computing environments do not provide. For example, some cloud computing environments may offer relatively little or no security (e.g., no substantial expectation of privacy with regard to information processed by the public cloud's resources), or a specified level of security at relatively higher costs (e.g., the privacy of information processed on the computing cloud is controlled to a specified extent (e.g., compliance level)). For another example, some cloud computing environments may be optimized for their computing (e.g., processing) capability (e.g., EC2™), while another cloud computing environment may be optimized for its memory storage capability (e.g., EBS™).

Computing clouds are typically made up of multiple computing node resources that may be housed in a single building, such as a data center, or may be dispersed over a broad geographical region. An example of such a computing node resources may include a computing cluster, a unified computing system, a fabric-based computing system, a dynamic infrastructure, and a converged infrastructure. A converged infrastructure may be any type having multiple hosts that each executes one or more virtual objects (e.g., virtual machines, virtual storage objects, and virtual switch objects).

In many cases, management of distributed applications that are implemented in such environments may be a challenging endeavor. For example, because the resources used to execute the distributed applications may be dispersed over numerous computing node resources, maintaining accurate performance objectives may be difficult to attain when changes are made to the underlying equipment used to provide the resources for the distributed applications. Additionally, because the demand of distributed applications change often, it would be beneficial to provide dynamic configuration management to the resources used to execute those distributed applications, but dependencies often exist between the various levels and types of resources such that effective dynamic management is often difficult to achieve.

Figure 1B:
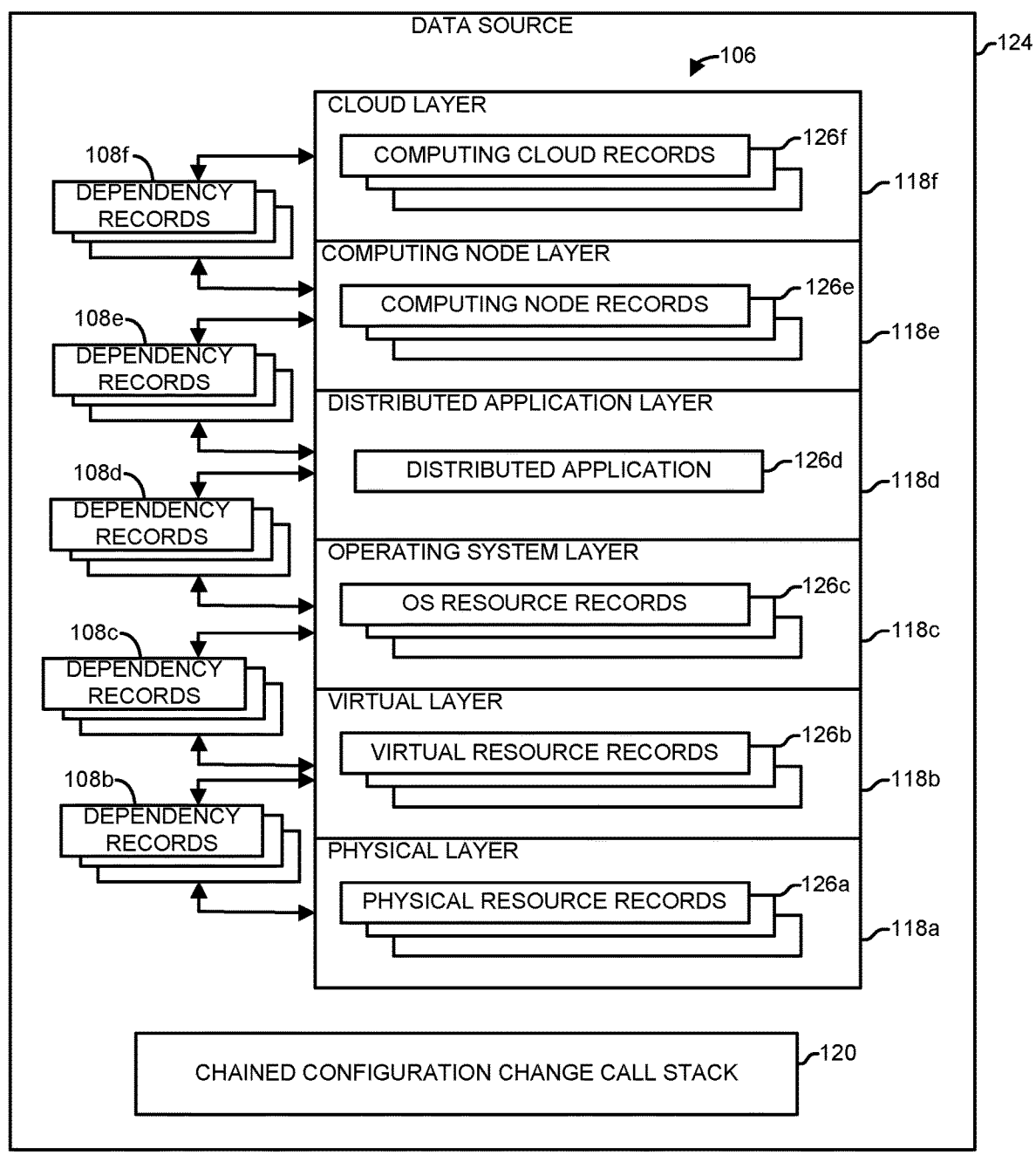

FIGS. 1A and 1B illustrate an example stack-based resource management system 100 according to the teachings of the present disclosure. The stack-based resource management system 100 addresses problems with conventional distributed computing environment management systems among other benefits and solutions. The system 100 includes a stack-based resource management tool computing device 102 for storing a stack-based resource management tool 104, a distributed computing environment protocol stack 106, and one or more inter-layer dependency records 108 representing one or more dependencies that may exist between the resources of adjacent layers in the distributed computing environment protocol stack 106. As will be described in detail herein below, the stack-based resource management tool 104 manages configuration changes to the resources, which are used to execute a distributed application 110, and sequentially traverses up and down the adjacent layers of the distributed computing environment protocol stack 106 to resolve any of the dependencies among the resources of each adjacent layer of the distributed computing environment protocol stack 106.

The distributed application 110 may be executed by multiple resources 114 that are distributed across a distributed computing environment 116. As shown, the distributed computing environment 116 includes a cloud resource 114*f* configured with multiple computing node resources 114*e*, which may include, for example, a computing cluster, a unified computing system, a fabric-based computing system, a dynamic infrastructure, and a converged infrastructure.

Additionally, certain computing node resources 114*e* of the distributed computing environment 116 may be virtualized computing environments, each having operating system (OS) resources 114*c* that are executed by virtual resources 114*b*, which are in turn executed by physical device resources 114*a*. Although the distributed application 110 is only shown as being implemented on a single computing node resource 114*e*, it should be appreciated that the distributed application 110 is executed on some or all of the computing node resources 114*e* of the distributed computing environment 116.

In general, the stack-based resource management system 100 manages the resources 114 used to execute the distributed application 110 using a distributed computing environment protocol stack 106 that includes a linear stack of layers 118 in which each layer 118 may be adjacent to a layer 118 above or below itself. When configuration changes are made to the resources 114 in a certain layer 118, the stack-based resource management system 100 identifies, using the inter-layer dependency records 108, any dependencies to any resources 114 in adjacent layers 118, and configures those resources 114 such that those dependencies are resolved. The stack-based resource management system 100 traverses sequentially up and down the distributed computing environment protocol stack 106 such that all dependencies throughout the distributed computing environment 116 are resolved. In one embodiment, the stack-based resource management system 100 may also store a chained configuration change call stack 120 that includes information associated with previous configuration changes made to the resources 114 during each distributed computing environment protocol stack traversal so that, in the event that a dependency cannot be resolved, the call stack may be accessed to un-configure any previously configured resources 114 (e.g., perform a roll back operation), and generate an alert message to be sent to the application 110 or user who requested the configuration change.

Although the distributed computing environment 116 is depicting as including a single computing cloud resource 114*f*, it is contemplated that the distributed computing environment 116 may include numerous private and/or public computing clouds 114*f*. For example, a computing cloud resource 114*f* may include one that provides dedicated use of one or more resources 114 on a lease-by-lease basis. Examples, of such computing clouds may include the Amazon EC2™, Amazon AWS™, Google Cloud™, as well as other privately owned and managed computing cloud resources 114*f*. As opposed to localized, stand-alone computing structures, a computing cloud usually includes networked components which may be in one or more remotely configured computing systems that function in a collaborative manner to provide services sometimes over a diverse geographic region. A typical computing cloud resource 114*f* may include hardware resources, virtual resources (e.g., virtual objects provided by a virtualization environment), gateways for secure management of data, communication nodes for communication among the multiple computing node resources, and/or other devices that support the overall operation of the computing cloud resource 114*f*.

Each computing node resource 114 may include any type, such as a computing cluster, a computing grid, a blade array, and/or a converged infrastructure (CI), which may also be referred to as a unified computing system, a fabric-based computing system, and a dynamic infrastructure that provides resources for the execution of distributed applications 110. The resources 114 of the computing node 114*d* may include any type, such as hardware resources or virtual objects. Example hardware resources 114 of the computing node 114d may include any type of hardware that provides physical resources for the computing node 114d while the virtual objects include logical entities, such as virtual machines, virtual switches, and virtual storage units. Virtual objects may also include logical configuration constructs, such as storage partitions, port groups, virtual private clouds, virtual local area networks (LANs), and private virtual data centers (PVDCs).

In one embodiment, the tool 104 communicates with one or more resource management tools 122 to manage the resources 114 in the distributed computing environment 116. Examples of such resource management tools include a vCenter Orchestrator™ and a UCS Director™ management tools. These computing environment management tools provide scriptable building blocks to perform management and orchestration tasks, such as provisioning of the resources of virtualized computing environments. For example, when the tool 104 determines a configuration change for a particular resource 114, it may access a resource management tool 122 that manages that particular resource 114, and transmit a configuration change request to the resource management tool 122 so that the appropriate configuration change is made. Additionally, the tool 104 may receive a response message from the resource management tool 122 indicating whether the configuration change was successful, and take an appropriate action based upon the response.

When requests are made to configure (e.g., provision, modify, de-provision) a resource 114, the stack-based resource management tool 104 identifies a particular computing node 114d that provides that resource to be managed and directs the request to the resource management tool 122 responsible for the resource 114. The stack-based resource management tool 104 may include logic to, upon receiving a request to manage or edit a particular resource, determine which computing cloud resource 114d that the resource 114 is part of, and communicate with the computing cloud resource 114d to manage the operation of the resource 114 using the resource management tool 122. For example, when the stack-based resource management tool 104 receives a request to modify a particular resource 114 due to some reason, such as increasing an amount of its allocated memory, it may access the resource information included in the distributed computing environment protocol stack 106 to obtain addressing information associated with a resource management tool (e.g., a cloud portal, resource manager, etc.), and communicate with that tool 122 to facilitate modification of that particular resource 114.

As best shown in FIG. 1B, the computing device 102 includes a data store 124 that stores the distributed computing environment protocol stack 106 and related inter-layer dependency records 108. The distributed computing environment protocol stack 106 includes several layers 118 representing the differing types of resources 114 that may exist in the distributed computing environment 116. For example, the distributed computing environment protocol stack 106 includes a physical device layer 118a including physical device records 126a that represents the physical device resources 114a in the distributed computing environment 116, a virtual layer 118b include virtual records 126b representing the virtual resources 114b in the distributed computing environment 116, an operating system (OS) layer 118c including OS records 126c representing each OS resource 114c executed on the virtual resources 114b, a distributed application layer 118d representing the distributed application 110 being managed by the tool 104, a computing node resource layer 118e including one or more computing node resource records 126e representing the computing node resources 114e of the distributed computing environment 116, and a cloud layer 118f including a cloud resource record 126f representing each cloud resource 114f managed by the tool 104. Although a physical device layer 118a, a virtual layer 118b, an OS layer 118c, a distributed application layer 118d, a computing node resource layer 118e, and a cloud layer 118f are shown, is should be understood that the distributed computing environment protocol stack 106 may include additional, fewer, or different types of layers without departing from the spirit and scope of the present disclosure.

The resources 114 of each layer 118 may have certain dependencies to other resources 114 in adjacent layers 118, which the system 100 stores as inter-layer dependency records 108. For example, the system 100 may store one or more dependency records 108 indicating that a virtual resource 114b has one or more dependencies to a physical device resource 114a, such as a minimum amount of memory, a minimum quantity of processors, a certain graphical processing unit (GPU) configuration, and the like. Thus, if a physical resource 114a is configured or modified in such a manner, the configuration of any virtual resource 114b executed on the physical resource 114a may be affected by that change. Additionally, an OS resource 114c executed on the virtual resource 114b may exhibit certain dependencies to that virtual resource 114b, such as a certain port configuration, a required virtual interface, a certain type and quantity of shared memory, and the like. In fact, the resources 114 in each layer 118 may exhibit certain dependencies to each layer above and below its layer. Thus, the system 100 stores inter-layer dependency records 108 indicating certain types of dependencies that may exist between the resources of adjacent layers 118.

Furthering the above example, the system 100 may store one or more dependency records 108c indicating that a OS resource 114c has one or more dependencies to a virtual resource 114b. As yet another example, the system 100 may store one or more dependency records 108d indicating that the distributed application 110 has one or more dependencies to an OS resource 114c, such as an event handling procedure configuration, a particular type of memory allocation scheme to be used, and the like. As yet another example, the system 100 may store one or more dependency records 108e indicating that the distributed application 110 has one or more dependencies to a computing node resource 114e, such as a certain compliance level, or performance level to be maintained by the computing node resource 114e that executes the distributed application 110. As yet another example, the system 100 may store one or more dependency records 108f indicating that a cloud resource 114f has one or more dependencies to a computing node resource 114e, such as if and how the resources 114 in each computing node resource 114e are to be migrated, how resources are to be allocated for the distributed application 110 based upon geographical location, tenant leasing requirements, and the like. When a configuration change is requested by either the distributed application 110 or a user (e.g., an administrator of the distributed application 110), the tool 104 traverses up and down the protocol stack 106 to resolve any dependencies to each resource in each adjacent layer 118. As yet another example, the system 100 may receive information associated with a dependency, and based upon the nature of the dependency, generate one or more algorithms for traversing the stack to ensure that the dependency is properly handled. As yet another example, the system 100 may receive storage characteristics required for use by an application, and automatically generate new storage volumes, such as fiber channel, iSCSI based storage arrays, and/or software defined storage arrays (e.g., ScaleIO) based upon the received storage characteristics to be used by the application.

The stack-based resource management tool computing device 102, and computing node resources 114 communicate with one another in any suitable manner, such as using wireless, wired, and/or optical communications. In one embodiment, the stack-based resource management tool computing device 102 and computing node resources 114 communicates with one another using a communication network, such as the Internet, an intranet, or another wired and/or wireless communication network. In another embodiment, the stack-based resource management tool computing device 102 and computing node resources 114 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol. Other examples of communication protocols exist. For example, the stack-based resource management tool computing device 102 and computing node resources 114 may communicate with one another without the use of a separate and a distinct network. Additionally, other embodiments contemplate that the modules employed by the stack-based resource management tool 104 are executed by a computing device (e.g., resource) configured on one of the computing node resources 114.

Figure 2A:
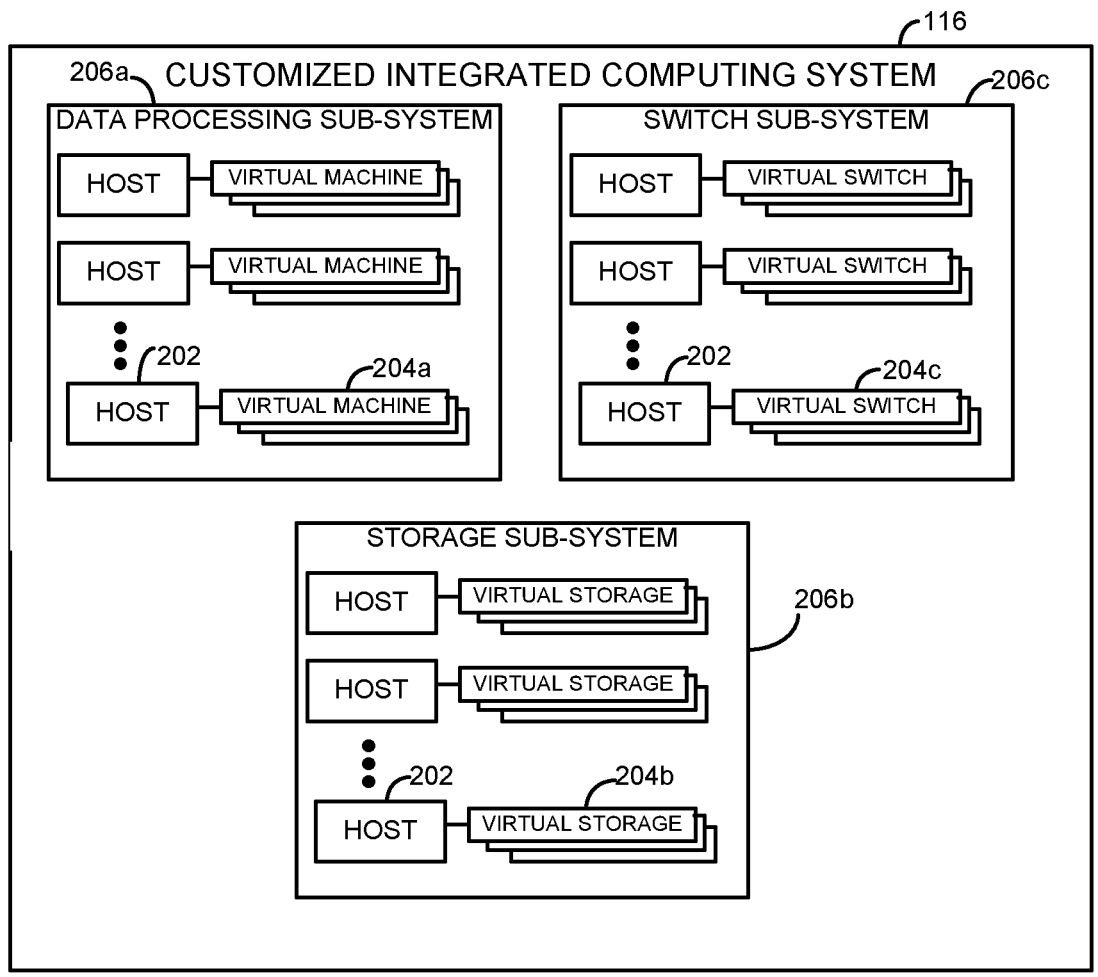
FIGS. 2A and 2B illustrate an example converged infrastructure that may be implemented as a computing node resource according to one embodiment of the present disclosure.
Figure 2B:
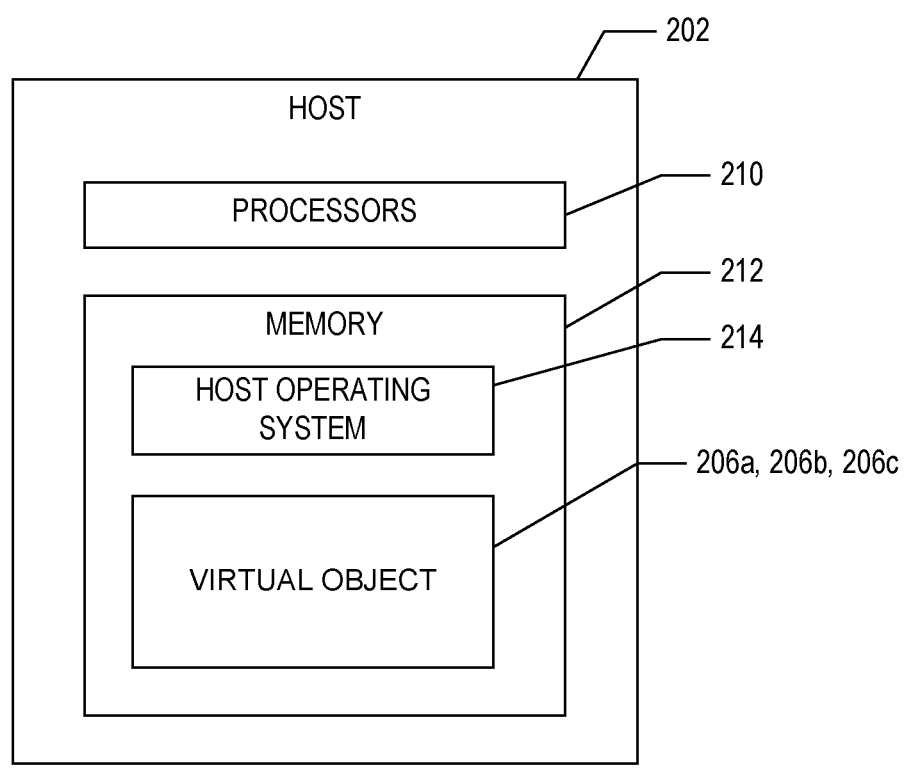

FIGS. 2A and 2B illustrate an example converged infrastructure 200 that may be implemented as a computing node resource 114 according to the teachings of the present disclosure. For example, multiple converged infrastructures 200 as described herein may be configured to communicate with one another using a communication network to form at least a portion of the distributed computing environment 114.

The converged infrastructure 200 may be any type having multiple hosts 202 that each executes one or more virtual objects (e.g., virtual machines 204a, virtual storage objects 204b, and virtual switch objects 204c). The hosts of a converged infrastructure are often referred to as compute servers. Nevertheless, in this disclosure, the term 'host' may be interpreted as any physical device and/or component that supports the operation of virtual elements 112 and services provided by those virtual elements. The particular converged infrastructure 200 as shown includes several sub-systems, such as a data processing sub-system 206a, a data storage sub-system 206b, and a switch sub-system 206c. Nevertheless, it should be understood that other converged infrastructures 200 may include additional, fewer, or different types of sub-systems without departing from the spirit and scope of the present disclosure.

In one aspect, each converged infrastructure 200 includes a combination of these sub-systems or other sub-systems that are packaged and interconnected in a standardized manner for ease of maintenance and use. Converged infrastructures such as these are often implemented in environments where relatively high reliability and/or availability are desired, such as in an enterprise environment. Nevertheless, it is contemplated that any converged infrastructure, such as a computer cluster, computing grid, blade array, and/or other converged infrastructure may be managed using the teachings of the present disclosure. For example, a converged infrastructure 200 such as that shown includes components found in Vblock™ System infrastructure packages available from DELL/EMC, LLC, which is located in Hopkinton, Mass.

In one aspect, the data storage sub-system 206b includes computer-readable memory structures for storing data used by the converged infrastructure 200, which may include network attached storage (NAS) arrays and/or storage area network (SAN) arrays that are facilitated by multiple virtual objects (e.g., virtual storage objects 204b). The switch sub-system 206c provides for communication among the various sub-systems of the converged infrastructure 200, and may include components, such as fabric interconnect systems, Ethernet switches/routers, multilayer director switches (MDSs), and the like. The data processing sub-system 206a executes applications that access, store, and otherwise manipulate data stored by the converged infrastructure 200. For a particular example, either of the data storage sub-system 206b, the switch sub-system 206c, and/or the data processing sub-system 206a may comprise a blade computing platform having multiple hosts (e.g., blade computing devices) 202 that each executes one or more virtual objects.

Each sub-system includes multiple hosts 202 that each executes one or more virtual objects, which in this particular example, are virtual machines (VMs) 204a, virtual storage objects 204b, and virtual switch objects 204c. For example, virtual objects, such as the VMs 204a may include software-based operating systems that are emulated on their respective hosts, which are physical computing devices. For each host, its respective VMs may be managed by a hypervisor that provides a virtual architecture for each VM's operation and controls various aspects of their operation. One example of a suitable hypervisor includes the VMware ESX™ software suite that is available from VMware corporation, which is located in Palo Alto, Calif.

FIG. 2B illustrates an example host 202 implemented on each converged infrastructure 200 according to one aspect of the data center management system 100. The host 202 is a computing or processing device that includes one or more processors 210 and a memory 212. For example, the host 202 can be a personal computer, such as a laptop or notebook computer, a workstation, or other processing device such as a personal digital assistant or a tablet computer. In a particular embodiment, the host 202 is a rack mounted host, such as blade host in which multiple blade hosts share a common backplane for communication with one another and for receiving power from a rack mounted power distribution unit. The memory 212 stores a host operating system 214 and one or more virtual objects (e.g., VMs 204a, virtual storage objects 204b, and virtual switch objects 204c) that are executed by the processor 210. The host operating system 212 controls and manages the operation of the virtual objects executed on the host 202. For example, control signaling for starting, stopping, and/or changing operating parameters of each virtual object is managed through the host operating system 212.

Figure 3:
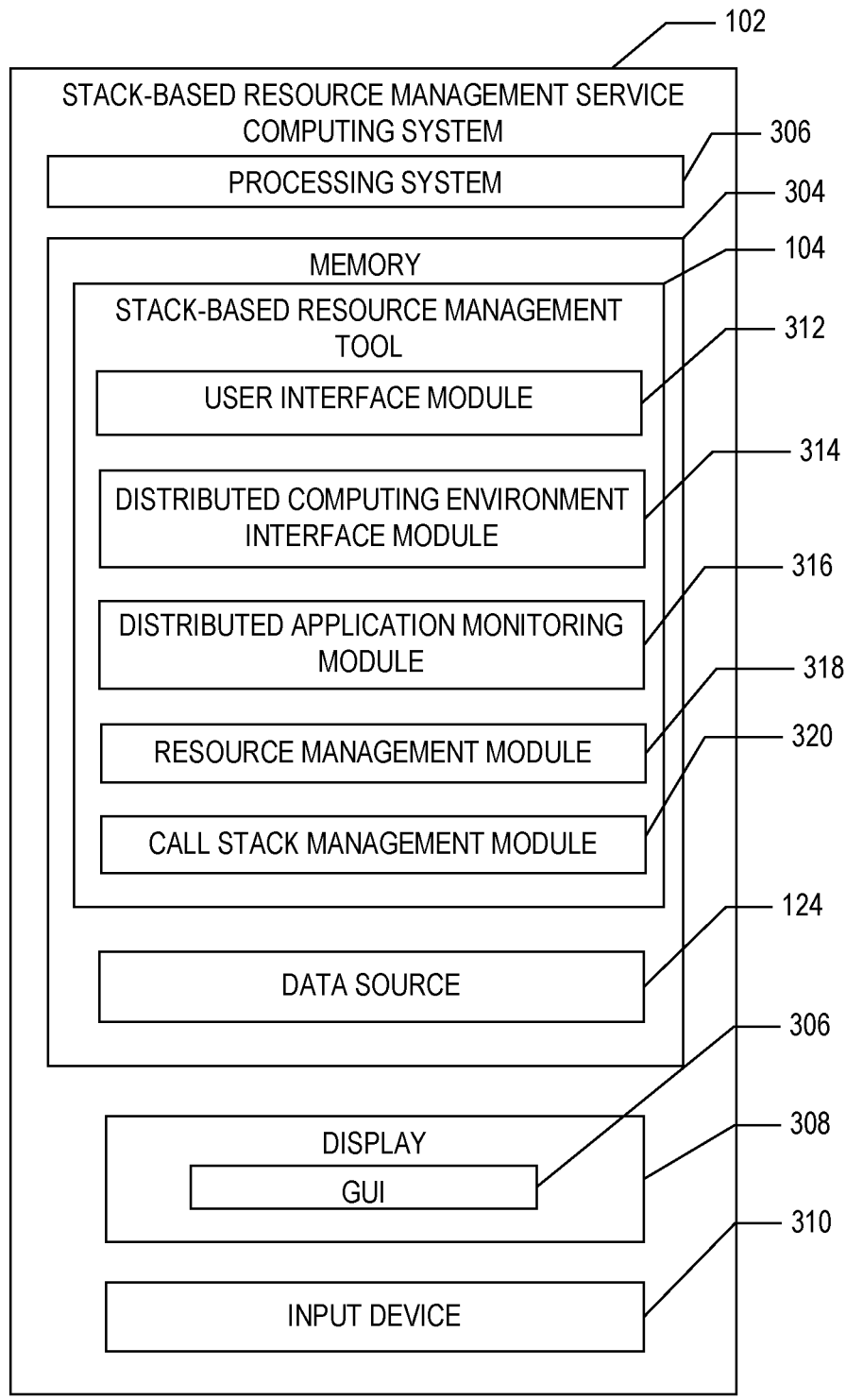
FIG. 3 illustrates a block diagram of an example stack-based resource management tool executed on the stack-based resource management tool computing device according to one embodiment of the present disclosure.

Referring now in more detail to FIG. 3, a block diagram of an example stack-based resource management tool 104 executed on the stack-based resource management tool computing device 102 is depicted according to one aspect of the present disclosure. The stack-based resource management tool 104 is stored in a memory 302 (i.e., computer readable media) and is executed on a processing system 304 of the stack-based resource management tool computing device 102. According to one aspect, the stack-based resource management tool computing device 102 also includes a graphical user interface (GUI) 306 displayed on the display 308, such as a computer monitor for displaying data. The stack-based resource management tool computing device 102 may also include an input device 310, such as a keyboard or a pointing device (e.g., a mouse, trackball, pen, or touch screen) to enter data into or interact with the GUI 306. According to one aspect, the stack-based resource management tool 104 includes instructions or modules that are executable by the processing system 304 as will be described in detail herein below.

The memory 302 includes volatile media, nonvolatile media, removable media, non-removable media, and/or another available medium. By way of example and not limitation, non-transitory memory 302 comprises computer storage media, such as non-transient storage memory, volatile media, nonvolatile media, removable media, and/or non-removable media implemented in a method or technology for storage of information, such as computer readable instructions, data structures, program modules, or other data.

An optional user interface module 312 receives user input for, and displays resource information to be used for managing the resources used to execute the distributed application 110. For example, the user interface module 312 may display some, most, or all resources 114 that are available for use by the distributed application 110, and may receive user input for adding or deleting resources 114 for use by the distributed application 110. Additionally, the user interface module 312 may receive user input associated with selection of a particular resource 114, and in response, display additional detailed information about that selected resource 114 for managing or editing various parameters associated with that selected resource 114.

A distributed computing environment interface module 314 communicates with the distributed computing environment 116 to manage its resources 114. In one embodiment, the distributed computing environment interface module 314 communicates with one or more resource management tools 122 to transmit instructions for configuring the resources 114 and receiving response information associated with whether the resource configuration were successful. The distributed computing environment interface module 314 may also, upon receipt of a request to configure a resource 114, determine which resource management tool 122 is appropriate for that request, and transmit the configuration request to that resource management tool 122. For example, each computing node resource 114e may comprise one of many differing types (e.g., a computing grid, a CI, a unified computing system, a fabric-based computing system, a dynamic infrastructure, etc.) whose management is conducted by separate and distinctly different resource management tools. The distributed computing environment interface module 314 determines which resource management tool 122 is to receive each configuration request, and transmits each configuration request to the appropriate resource management tool 122. Because a computing node resource 114e may include resources 114 that differ in their capabilities, structure, operation, and/or purpose, the distributed computing environment interface module 314 may be generated in a manner to handle the particular characteristics of its respective resource 114 such that it may be effectively managed.

A distributed application monitoring module 316 communicates with the application 110 to receive instructions for monitoring the resources in one or more other layers of the stack that would otherwise be difficult to accomplish by the application 110 itself. For example, the application 110 may issue instructions for the module 316 to monitor processor loading at the operating system layer 118c, and report back to the application 110 when processor loading of a particular resource exceeds and/or goes below certain threshold levels. In one embodiment, the module 316 may be responsive to instructions issued from the application 110 to take certain actions when a monitored resource goes beyond certain threshold levels. For example, the application 110 may issue instructions for the module 316 to monitor memory usage level at the operating system layer 118c, and add additional memory when an upper threshold level is reached, and remove existing memory when a lower threshold level is reached.

The distributed application monitoring module 316 monitors the health of the distributed application 110 and automatically generates configuration requests for configuring the resources 114 used to execute the distributed application 110 to compensate for ongoing changes in the distributed application 110. In one embodiment, the distributed application monitoring module 316 periodically and/or aperiodically polls various characteristics (e.g., memory usage levels, processing load, throughput delays, etc.) of the distributed application 110 to determine whether any configuration changes to the resources 114 are needed. If so, the distributed application monitoring module 316 may determine a particular change to be implemented and transmit the determined configuration to the resource management module 318 for implementing the change.

A resource management module 318 manages the operation of the resources 114 used to execute the distributed application 110 using the distributed computing environment protocol stack 106. For example, when the resource management module 318 receives a request to configure a particular resource 114, it may identify its associated resource record 126 in the distributed computing environment protocol stack, access the information included in the resource record 126 to determine which resource management tool 122 is responsible for the resource 114, and generate a request to configure the resource 114 according to information included in the request. Additionally, the resource management module 318 may linearly traverse up and down each adjacent layer in the distributed computing environment protocol stack 106 to resolve any dependencies associated with the configuration change. For example, the resource management module 318 may identify any dependencies associated with any resources 114 in the layer immediately above the layer 118 in which the subject resource 114 is in, and generate one or more additional configuration changes that can be transmitted to an appropriate resource management tool 122 for facilitating those configuration changes. This procedure is then repeated for other resources 114 in successive, adjacent layers in the distributed computing environment protocol stack 106.

A configuration call stack management module 320 communicates with the application 110 to receive information for un-configuring previous configuration changes. That is, the configuration call stack management module 320 store information associated with the sequenced configuration changes in throughout the distributed computing environment protocol stack 106 so that, in the event that a configuration change at one layer 118 fails, the application 110 may send a request to un-configure any previously configuration changes. For example, when a configuration request is received to change a port configuration at the physical level, that configuration request may be performed on a resource 114a at the physical layer 118a. Nevertheless, the changed port configuration may also incur a dependency that requires the virtual resources 114b to also adjust their port configuration. However, when a request that has been issued to a virtual resource 114b to change its port configuration fails, the application 110 may issue a request to the module 320 to pull the information associated with the request to configure the resource 114 in the physical layer 118a so that it can be un-configured, and generate an error message that is sent to the user interface module 312 to inform the user of the failed configuration change.

It should be appreciated that the modules described herein are provided only as examples, and that the stack-based resource management tool 104 may have different modules, additional modules, or fewer modules than those described herein. For example, one or more modules as described in FIG. 3 may be combined into a single module. As another example, certain modules described herein may be encoded on, and executed on other computing systems, such as on one of the resources 114 of a computing cloud resource 116f.

Figure 4:
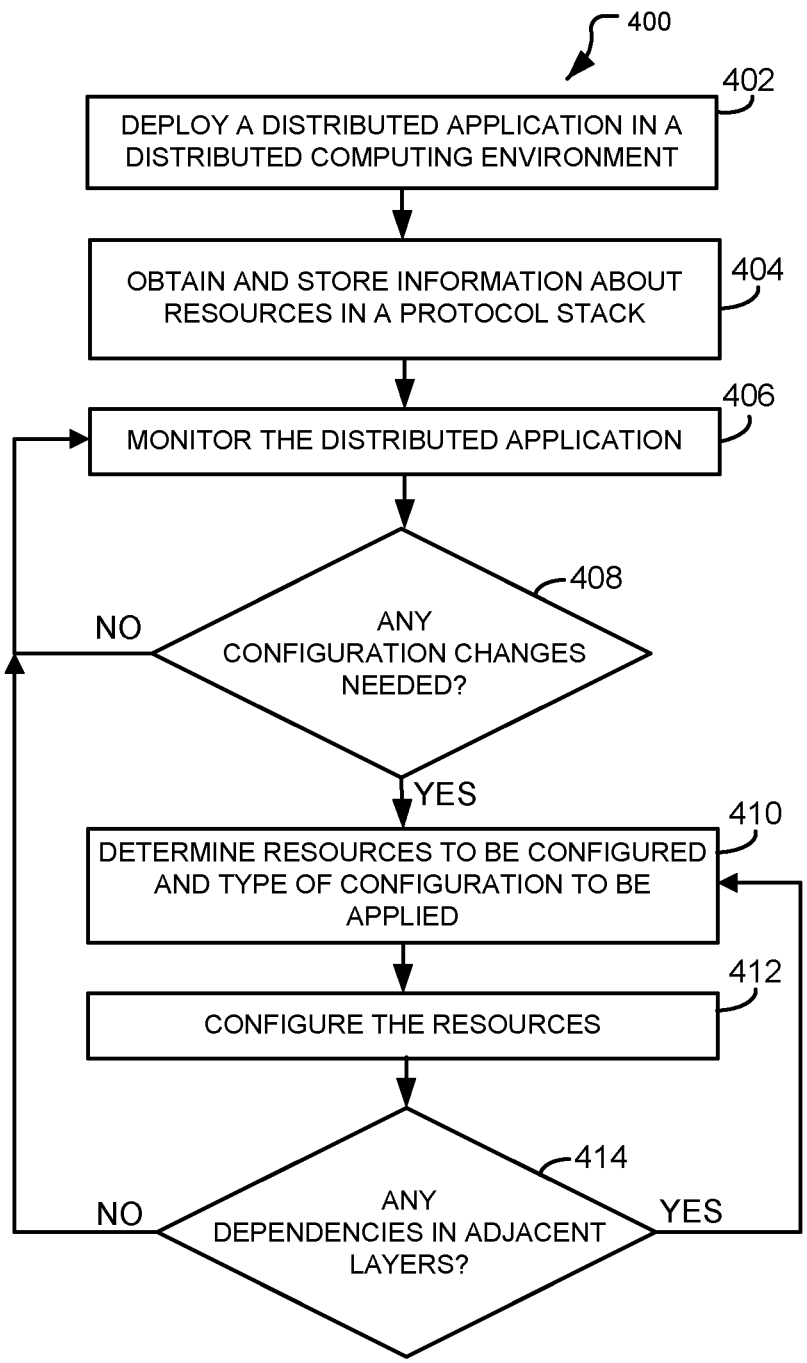
FIG. 4 illustrates an example process that may be performed by the stack-based resource management tool to manage the resources that are used by a distributed application according to one embodiment of the present disclosure.

FIG. 4 illustrates an example process 400 that may be performed by the stack-based resource management tool 104 to manage the resources that are used by a distributed application 110 according to one embodiment of the present disclosure.

Initially at step 402, a distributed application 110 is deployed in a distributed computing environment 116. In one embodiment, the distributed application 110 is deployed on one or more cloud computing environments, which may include private and/or public cloud computing environments. In another embodiment, one or more of the cloud computing environments 114f may include computing node resources implemented in a virtualized computing environment, such as a dynamic infrastructure or a converged infrastructure.

At step 404, information about the resources of the distributed computing environment 116 are stored in a distributed computing environment protocol stack 106 according to their type. For example, information associated with any virtual resources 114 used to execute the distributed application 110 may be stored in a virtual layer 118b of the distributed computing environment protocol stack 106, and the physical resources 114a used to execute the virtual resources 114b are stored in a physical layer 118a of the distributed computing environment protocol stack 106. Additionally, information associated with any particular computing node resource 114 on which the virtual resources 114b may be stored in a computing node resource layer 118e, while any particular cloud resource 114f in which the computing node resource 114e is configured is stored in a cloud layer 118f of the distributed computing environment protocol stack 106.

At step 406, the tool 104 monitors the operation of the distributed application 110 and determines whether any configuration changes are necessary. For example, the tool 104 may monitor any communication channels used by the distributed application 110 to determine whether or not any congestion (e.g., bottleneck conditions) exists in the channel. As another example, the tool 104 may monitor the processing load of the resources 114 used to execute the distributed application 110 to determine whether those resources are being overloaded. As yet another example, the tool 104 may monitor one or more memory storage resources 114 to determine whether additional memory capacity should be added for use by the distributed application 110.

The tool 104 may determine that a configuration change is necessary according to any suitable criteria. For example, the tool 104 may determine that a configuration change is necessary when a monitored function of the distributed application 110 exceeds one or more threshold values that are settable by the administrator of the distributed application 110. At step 408, if no configuration changes are necessary, processing continues at step 406 to continually monitor the health of the distributed application 110; other processing continues at step 410.

At step 410, the tool 104 determines which resources need to be configured and a type of configuration to be applied to those resources. For example, if it is determined that a particular communication channel is experiencing congestion, the tool 104 may determine that additional ports should be added, additional bandwidth should be added to existing ports, and/or a combination thereof. Conversely, if it is determined that the communication channel is idle, the tool 104 may determine that one or more existing ports should be de-allocated, existing bandwidth reduce, and/or any combination thereof.

Thereafter at step 412, the tool 104 configures those resources determined at step 410. In one embodiment, the tool 104 communicates with an resource management tool 122 responsible for managing the operation of those resources 114.

At step 414, the tool 104 determines whether any dependencies exist in the resources of the layers 118 immediately adjacent to the resources configured at step 412. For example, the tool 104 may access the inter-layer dependency records 108 stored in the data source 124 to identify whether the resources 114 configured in step 412 have any dependencies to the resources in an adjacent layer 118. If not, processing continues at step 406 for continual monitoring of the resources 114 of the distributed application 110; otherwise, processing continues at step 410 in which the resources 114 in the adjacent layers 118 are configured to resolve the dependencies.

The process of steps 410 through 414 are repeatedly applied to successive adjacent layers 118 of the distributed computing environment protocol stack 106 so that all pertinent dependencies are resolved in the distributed computing environment 116. In one embodiment, the tool 104 may, upon completion of each successive configuration change, store information associated with the configuration change in a call stack 106. Therefore, if a certain configuration change in a sequential chain of configuration changes fails, all of the previous configuration changes may be backed out so that system integrity is maintained.

The previous steps may be repeatedly performed for continual management and monitoring of the resources 114 used to execute a distributed application 110 using a distributed computing environment protocol stack 106. Nevertheless, when use of the stack-based resource management tool 104 is no longer needed or desired, the process ends.

Although FIG. 4 describes one example of a process that may be performed by the stack-based resource management tool 104, the features of the disclosed process may be embodied in other specific forms without deviating from the spirit and scope of the present disclosure. For example, the stack-based resource management tool 104 may perform additional, fewer, or different operations than those operations as described in the present example. As another example, the steps of the process described herein may be performed by a computing system other than the stack-based resource management tool computing device 102, which may be, for example, one or more of the resources 114 of the distributed computing environment 302.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
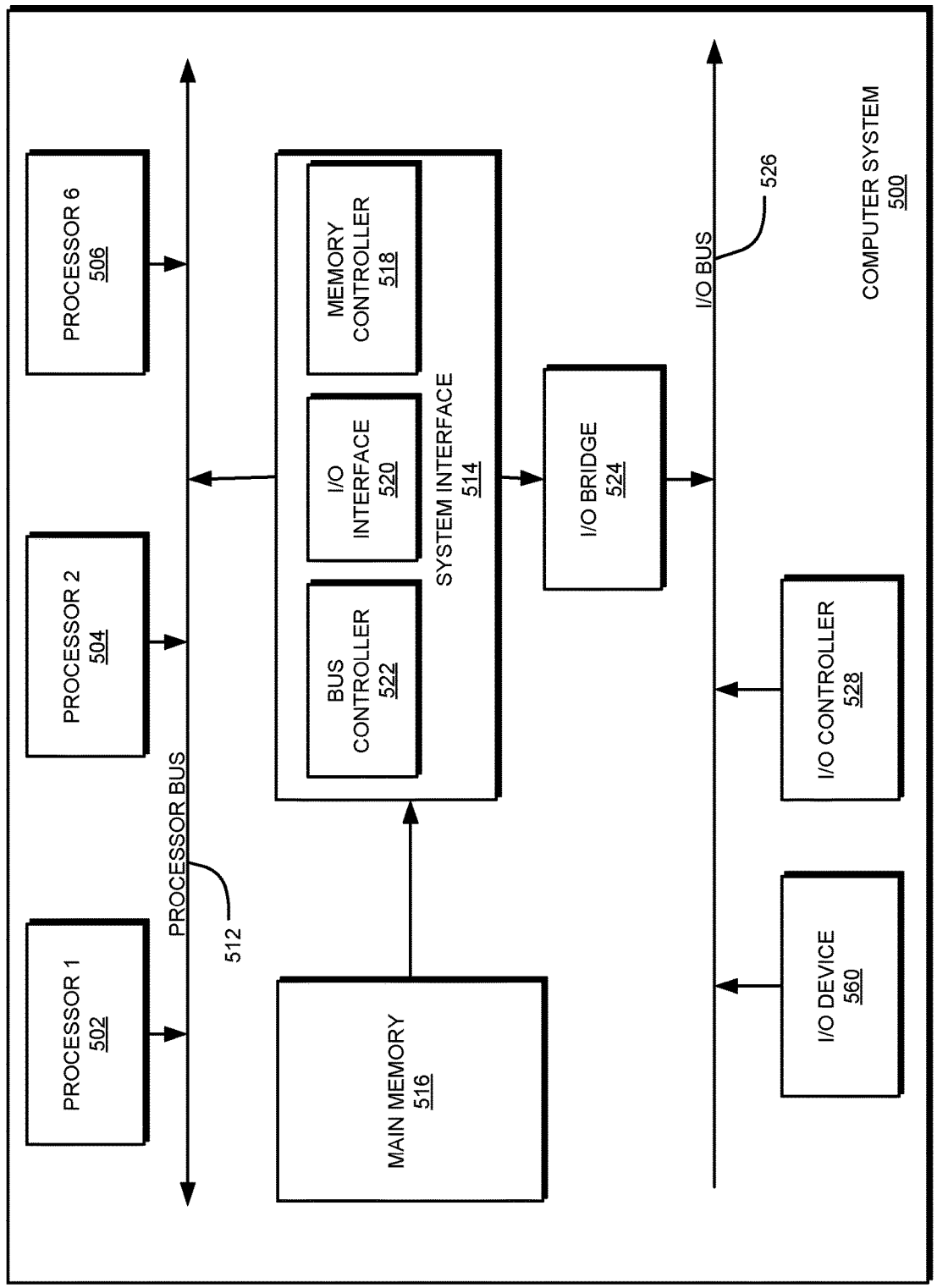
FIG. 5 is a block diagram illustrating an example of a computing device or computer system which may be used in implementing the embodiments of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A stack-based resource management system comprising:
 a computing device comprising at least one memory storing a tool executed by at least one processor to:
  obtain and store a distributed computing environment protocol stack comprising a plurality of layers, each of the layers comprising one or more records associated with a type of resource of a plurality of resources used to execute a distributed application, wherein at least one represented resource in each layer of the plurality of layers of the distributed computing environment protocol stack has one or more inter-layer dependencies to one or more represented resources of an adjacent layer of the distributed computing environment protocol stack;
  receive instructions, from the distributed application represented by a distributed application layer of the plurality of layers, to configure one or more first resources of the distributed application, the one or more first resources associated with a first one or more records of a layer of the plurality of layers of the distributed computing environment protocol stack other than the distributed application layer;
  transmit the instructions to the first resources, wherein the first resources are configured according to the instructions; and
  sequentially traverse adjacent layers up and down the plurality of layers of the distributed computing environment protocol stack to a top end and a bottom end of the distributed computing environment protocol stack, wherein traversing the adjacent layers comprises resolving inter-layer dependencies between adjacent layers of the distributed computing environment protocol stack.

2. The stack-based resource management system of claim 1, wherein the tool is further executed to:
 detect a need for configuring the one or more first resources; and
 automatically generate the instructions to be transmitted to the one or more first resources.

3. The stack-based resource management system of claim 1, wherein the first resources are configured in a virtualized computing environment, the layer of the plurality of layers of the distributed computing environment protocol stack comprising at least one of a physical device layer, a virtual resource layer, or an operating system layer.

4. The stack-based resource management system of claim 1, wherein the first resources are configured in a cloud computing environment, the layer of the plurality of layers of the distributed computing environment protocol stack comprising at least one of an infrastructure layer and a cloud layer.

5. The stack-based resource management system of claim 1, wherein the tool is further executed to:
 store information associated with each of a plurality of sequentially configured resources; and
 when an ensuing resource fails to be configured properly, sequentially un-configure each of the plurality of sequentially configured resources.

6. The stack-based resource management system of claim 5, wherein the tool is further executed to transmit an error message to the distributed application indicating that the ensuing resource has failed to be configured properly.

7. The stack-based resource management system of claim 1, wherein the inter-layer dependencies comprise at least one of a performance objective for the resources or a compliance objective for the resources.

8. The stack-based resource management system of claim 1, wherein the tool is further executed to sequentially traverse the adjacent layers up and down the plurality of layers of the distributed computing environment by:
 identifying whether any adjacent dependencies exist in a plurality of resources of one or more adjacent layers to the layer; and
 when at least one adjacent dependency exists, generate one or more additional instructions for configuring at least one resource associated with the adjacent dependencies; and
 transmit the additional instructions to the plurality of resources the one or more adjacent layers to the layer, wherein the at least one resources in the one or more adjacent layers are configured according to the instructions.

9. A stack-based resource management method comprising:
 obtaining and storing, using coded instructions stored in at least one memory and executed by at least one processor, a distributed computing environment protocol stack comprising a plurality of layers, each of the layers comprising one or more records associated with a type of resource of a plurality of resources used to execute a distributed application, wherein at least one represented resource in each layer of the plurality of layers of the distributed computing environment protocol stack has one or more inter-layer dependencies to one or more represented resources of an adjacent layer of the distributed computing environment protocol stack;
 receiving, using the coded instructions, configuration instructions from the distributed application represented by a distributed application layer of the plurality of layers, the configuration instructions to configure one or more resources of the distributed application, the one or more resources associated with one or more records of a layer of the plurality of layers of the distributed computing environment protocol stack other than the distributed application layer;
 transmitting, using the coded instructions, the configuration instructions to the one or more resources of the layer, wherein the one or more resources are configured according to the configuration instructions; and
 sequentially traversing adjacent layers, using the coded instructions, up and down the plurality of layers of the distributed computing environment protocol stack to a top end and a bottom end of the distributed computing environment protocol stack, wherein traversing the adjacent layers comprises resolving inter-layer dependencies between adjacent layers of the distributed computing environment protocol stack.

10. The stack-based resource management method of claim 9, further comprising:
 detect a need for configuring the one or more resources; and
 automatically generate the configuration instructions to be transmitted to the one or more resources.

11. The stack-based resource management method of claim 9, wherein the one or more resources are configured in a virtualized computing environment, the layer of the plurality of layers of the distributed computing environment protocol stack comprising at least one of a physical device layer, a virtual resource layer, and an operating system layer.

12. The stack-based resource management method of claim 9, wherein the one or more resources are configured in a cloud computing environment, the layer of the plurality of layers of the distributed computing environment protocol stack comprising at least one of a infrastructure layer and a cloud layer.

13. The stack-based resource management method of claim 9, further comprising:
    store information associated with each of a plurality of sequentially configured resources; and
    when an ensuing resource fails to be configured properly, sequentially un-configure each of the plurality of sequentially configured resources.

14. The stack-based resource management method of claim 13, further comprising transmitting an error message to the distributed application indicating that the ensuing resource has failed to be configured properly.

15. The stack-based resource management method of claim 9, wherein the inter-layer dependencies comprise at least one of a performance objective for the resources, or a compliance objective for the resources.

16. Code implemented in a non-transitory, computer readable medium that when executed by at least one processor, is operable to perform at least the following:
    receiving configuration instructions from the distributed application represented by a distributed application layer of the plurality of layers, the configuration instructions to configure one or more resources of the distributed application, the one or more resources associated with one or more records of a layer of the plurality of layers of the distributed computing environment protocol stack other than the distributed application layer;
    transmitting, using the coded instructions, the configuration instructions to one or more resources of the layer, wherein the one or more resources are configured according to the configuration instructions; and
    sequentially traversing adjacent layers, up and down the plurality of layers of the distributed computing environment protocol stack to a top end and a bottom end of the distributed computing environment protocol stack, wherein traversing the adjacent layers comprises resolving the inter-layer dependencies between adjacent layers of the distributed computing environment protocol stack.

17. The code of claim 16, further operable to perform:
    detect a need for configuring the one or more resources; and
    automatically generate the configuration instructions to be transmitted to the one or more resources.

18. The code of claim 16, further operable to perform:
    store information associated with each of a plurality of sequentially configured resources; and
    when an ensuing resource fails to be configured properly, sequentially un-configure each of the plurality of sequentially configured resources.

* * * * *

UNITED STATES PATENT AND TRADEMARK OFFICE
CERTIFICATE OF CORRECTION

PATENT NO. : 10,680,970 B1
APPLICATION NO. : 15/499179
DATED : June 9, 2020
INVENTOR(S) : Jonathan Streete and Seamus Kerrigan Page 1 of 1

It is certified that error appears in the above-identified patent and that said Letters Patent is hereby corrected as shown below:

In the Claims

In Claim 16, Column 17, Line 26, after 'following:' insert as Line 27 -- obtaining and storing a distributed computing environment protocol stack comprising a plurality of layers, each of the layers comprising one or more records associated with a type of resource of a plurality of resources used to execute a distributed application, wherein at least one represented resource in each layer of the plurality of layers of the distributed computing environment protocol stack has one or more inter-layer dependencies to one or more represented resources of an adjacent layer of the distributed computing environment protocol stack; --

Signed and Sealed this
First Day of September, 2020

Andrei Iancu
*Director of the United States Patent and Trademark Office*